UNITED STATES PATENT OFFICE.

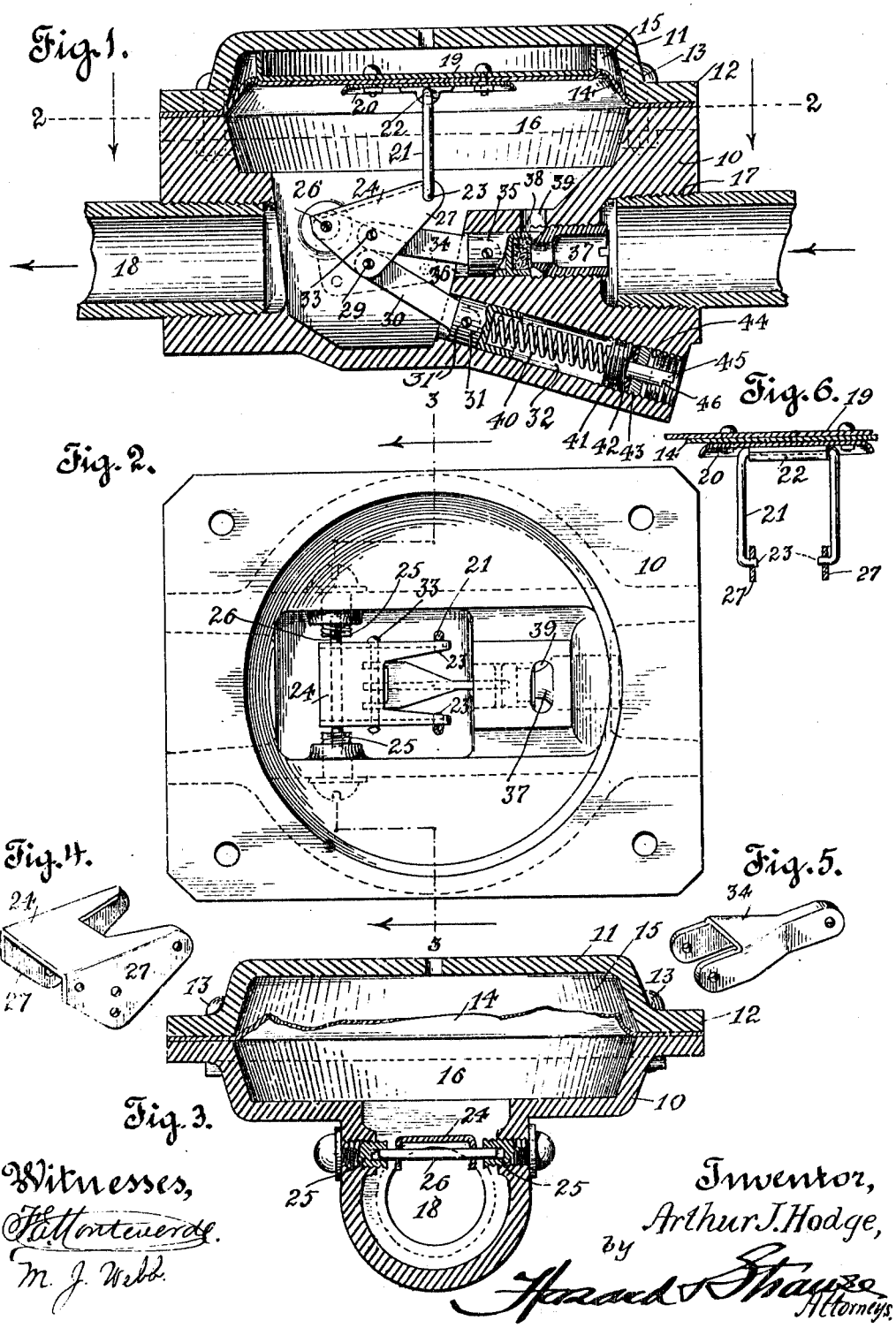

ARTHUR J. HODGE, OF PASADENA, CALIFORNIA, ASSIGNOR TO RELIANCE GAS REGULATOR & MACHINE COMPANY, OF PASADENA, CALIFORNIA, A CORPORATION OF CALIFORNIA.

GAS-REGULATOR.

1,107,612.   Specification of Letters Patent.   Patented Aug. 18, 1914.

Application filed May 9, 1913. Serial No. 766,491.

*To all whom it may concern:*

Be it known that I, ARTHUR J. HODGE, a citizen of the United States, residing at Pasadena, in the county of Los Angeles, State of California, have invented new and useful Improvements in Gas-Regulators, of which the following is a specification.

This invention relates to improvements in gas regulators, and especially to devices adapted to automatically regulate the pressure between the gas mains and the service pipes of buildings, and the principal object is to provide a gas regulator in which the diaphragm is under an equable tension irrespective of the position in which the regulator may be placed.

It is a further object to provide a simple and efficient mechanism to accomplish the results pointed out above.

In the drawings accompanying this specification and forming a part of the application for Letters Patent:

Figure 1 is a longitudinal central section through the mechanism showing the operating lever and its links in elevation. Fig. 2 is a view of the casing with the cover removed, as on the line 2—2, Fig. 1, and viewed in the direction of the arrows. Fig. 3 is a transverse section through the casing on the line 3—3 showing the pivotal mounting for the lever. Fig. 4 is a perspective view of the pivoted lever clearly showing its preferred form and pressed out of sheet metal. Fig. 5 is a perspective view of the link pivoted to the sliding valve. Fig. 6 is a detail view of the link connecting the diaphragm and lever, with portions of the diaphragm and lever shown in section.

In the drawings showing the details and specific features of the invention, 10 represents the casing provided with a suitable cover 11, provided with flanges 12 on their approximated surfaces. Between these flanges and securely held by the securing bolts 13 passing therethrough, is the diaphragm 14 formed of suitable flexible material capable of confining gas. The two chambers 15 and 16 formed by the diaphragm as a variable partition are preferably circular in form, each having openings therein. The chamber 15 is open to the outside air and the gas pressure chamber 16 is provided with suitable inlet opening 17 and outlet opening 18 provided with suitable means to secure pipes thereto. Centrally mounted on the diaphragm and concentric therewith are the plates 19 and 20, which are preferably dished to some extent, the outer plate 19 acting as a stop against the inside of the cover. The inner plate 20 serves as a support for the connecting link 21 suitably pivoted in the bearings 22, the terminal ends of the link being provided with the bearings 23 adapted to engage with the operating lever.

Pivotally mounted within the casing is the operating lever 24, which is preferably formed, as clearly shown in Fig. 4, of suitable sheet metal pressed into the required shape. In the restricted portion of the pressure chamber 16 and approximately in axial line with the inlet and outlet openings are the bearings 25, which support the pivot 26 on which the lever 24 is freely movable. These bearings 25 are shown securely threaded into the side walls of the extension so that the parts can be readily removed or adjusted. This pivoted lever is provided with suitable side walls 27 which form the bearings for the various pivots and is cut away on its connecting face to avoid interference with link 34. The side walls 27 of approximately triangular form, with the pivot bearings for the lever at one angle of the triangle, while the link 21 connecting the lever to the diaphragm with the pivotal bearings for its pivots 23 placed at the most distant angle of the lever or point of greatest leverage. The other angle is provided with the pivot 29 to which is pivoted a link 30, which engages with the sliding member 31 supported in a bore 32. Intermediate of these three pivots is the pivot 33, to which is pivoted the lever 34, which is connected to the sliding valve 35 by pivotal means. This valve 35 is shown of cylindrical form and reciprocally mounted in a suitable valve chamber formed in the casing and registering with the axial line of the inlet opening. Engaging with the valve 35 is the adjustable valve seat 37, shown as a chambered threaded structure threaded into the valve chamber 36 and provided with a conical formed valve seat which is tapered to form a rather sharp seat, adapted to make a tight contact with the gaskets 38 inclosed in and forming the face of the valve 35. The opening 39 connects the valve chamber to the pressure chamber 16. In the same plane, preferably external to the valve chamber is the bore 32 in which is placed the sliding member 31 under compression of the spring 40. The outer end of this bore, circular in cross section, opens exteriorly, and is screw threaded to receive a threaded plug 41 to which is secured a pin 45. A gasket 42 surrounds the pin and is compressed by the washer 43 also threaded into the chamber and provided with a slot 44 to receive a screw driver. The outer end of the pin 45 is cut away at 46 and is adapted to engage a hollow wrench which may be inserted to turn the plug 41, and by its movement adjust the tension of the spring 40, this spring having a suitable seat in the sliding member 31. The other end of the wrench is adapted to engage the slot 44, to turn the washer 43 to compress the gasket to a gas tight joint.

As is readily seen in the operation of my regulator, the inlet opening is shown as closed in Fig. 1, the pressure in the chamber 16 containing gas being sufficient to overcome the tension of the spring 40. On the release of this pressure by the exit of the gas through the outlet 18 and its connection the tension of the spring through its connecting link on the lever 24 forces the lever to the position shown in dotted lines in Fig. 1, draws the diaphragm into the pressure chamber and the valve 35 is opened and gas may enter the chamber 16, and when sufficient pressure has been obtained therein the diaphragm will be forced outward and return the lever to the position shown in solid lines with the valve closed. As will be readily seen the pivots 26, 29 and 31' are nearly in the same line, the pivot 29 being offset slightly so that the leverage exerted is at its lowest position. As the pressure is relieved the tension of the spring becomes less by extension, but the leverage increases with the movement of the lever and the resulting tension exerted on the diaphragm is practically constant resulting in a more equable distribution of the gas through the service pipes and less violent action of the diaphragm. This action is simple and the members are readily assembled and the form of the lever and the connecting links allow a rigid and positive control.

What I claim is:

1. A gas regulator, comprising a casing having a gas inlet and outlet, a flexible diaphragm mounted therein, a sliding valve member controlling said inlet, a pivotally mounted operating lever, a spring tension mechanism mounted in said casing, said mechanism adapted to actuate said diaphragm with equable compression and to control the movement of said sliding valve, and a plurality of links pivotally connected to said operating lever, the free ends of said links being connected to the sliding valve, diaphragm and spring tension mechanism respectively.

2. A gas regulator, comprising a casing, a diaphragm mounted therein, a sliding inlet valve mounted in said casing, a resiliently actuated slide member mounted in a bore formed in said casing, a pivotally mounted lever in said casing, a plurality of connecting links pivotally connected to said lever, the free ends of each of said link being pivoted to said sliding inlet valve, slide member, and diaphragm respectively, and resilient means to actuate said slide member in opposition to said diaphragm to control the inlet valve.

3. A gas regulator, comprising a casing having a diaphragm mounted therein, a pivoted lever mounted adjacent to said diaphragm, a link connecting said lever and diaphragm, an inlet valve, a link connecting said valve and lever, and spring actuated means interposed adjacent said pivot connection for the valve and intermediate the pivots for the pivoted lever and diaphragm, whereby an equable tension is applied to said diaphragm.

4. A gas regulator, comprising a casing having inlet and outlet apertures, a diaphragm mounted therein, a pivotally mounted lever, a link connecting said diaphragm and lever, having a pivotal connection at the point of greatest leverage on said lever, a valve controlling said inlet, a link connecting said valve and lever having a pivotal connection with the lever intermediate of the greatest leverage of said lever, a spring actuated slide, and a link connecting said slide and lever having a pivotal connection with said lever adapted to increase the leverage of the action as the spring tension is reduced.

In witness that I claim the foregoing I have hereunto subscribed my name this 13th day of November, 1912.

ARTHUR J. HODGE.

Witnesses:
GEO. S. FLINTOFT,
EARLE R. POLLARD.